United States Patent
Ozaki

(10) Patent No.: US 8,395,811 B2
(45) Date of Patent: Mar. 12, 2013

(54) PRINT CONTROL APPARATUS, PRINT CONTROL METHOD, AND COMPUTER-READABLE STORAGE MEDIUM STORING A PRINT CONTROL PROGRAM

(75) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 802 days.

(21) Appl. No.: 12/368,686

(22) Filed: Feb. 10, 2009

(65) Prior Publication Data

US 2009/0213395 A1 Aug. 27, 2009

(30) Foreign Application Priority Data

Feb. 22, 2008 (JP) ................................. 2008-042073

(51) Int. Cl.
*H04N 1/60* (2006.01)
(52) U.S. Cl. ........................... 358/1.9; 358/1.1; 358/1.15
(58) Field of Classification Search .................. 358/1.9, 358/1.1, 1.15; 715/764, 808, 809
See application file for complete search history.

(56) References Cited

U.S. PATENT DOCUMENTS

| 6,181,436 | B1 | 1/2001 | Kurachi | |
|---|---|---|---|---|
| 7,082,574 | B2 * | 7/2006 | Ogino et al. | 715/764 |
| 7,271,925 | B2 | 9/2007 | Nishiyama | |
| 2006/0245803 | A1 * | 11/2006 | Kamei | 400/62 |
| 2006/0250834 | A1 * | 11/2006 | Chinn et al. | 365/63 |
| 2008/0129555 | A1 * | 6/2008 | Yim et al. | 341/24 |
| 2008/0151293 | A1 * | 6/2008 | Narukawa | 358/1.15 |

FOREIGN PATENT DOCUMENTS

| JP | H10-301727 A | 11/1998 |
|---|---|---|
| JP | 2002-14788 A | 1/2002 |
| JP | 2002-91742 A | 3/2002 |
| JP | 2007-179353 A | 7/2007 |

OTHER PUBLICATIONS

Japanese Office Action dated Apr. 16, 2012 for JP 2008-042073.

* cited by examiner

*Primary Examiner* — King Poon
*Assistant Examiner* — Iriana Cruz
(74) *Attorney, Agent, or Firm* — Carter, DeLuca, Farrell & Schmidt LLP

(57) ABSTRACT

There are provided a get unit that gets a document name of print data; a first determination unit that determines whether or not the obtained document name includes a predefined character string; a first deletion unit that deletes the character string from the document name to create a new document name when it is determined that the document name includes the predefined character string; a second determination unit that determines whether or not the number of characters in the document name exceeds a predefined maximum number of displayable characters; and a second deletion unit that deletes the number of exceeding characters from a head of the document name to create a new document name when it is determined that the number of characters in the document name exceeds the predefined maximum number of displayable characters.

12 Claims, 11 Drawing Sheets

F I G. 5B

| MANAGE DOCUMENT NAME |
|---|

DELETE SETTINGS (S)
- ● NO DELETION
- ○ DELETE UP TO AND INCLUDING THE CHARACTER STRING BELOW
- ○ DELETE THE CHARACTER STRING BELOW

CHARACTER STRING SETTINGS (N) : [_____] (WITHIN 16 FULL-WIDTH CHARACTERS)

☑ DELETE HEAD PORTION WHEN THE DOCUMENT NAME EXCEEDS
   NUMBER OF DISPLAYABLE CHARACTERS OF THE PRINTING APPARATUS (D)

[ OK ]   [ CANCEL ]   [ HELP (H) ]

FIG. 7

| EXTENSION | APPLICATION NAME | CHARACTER STRING FOR DELETION |
|---|---|---|
| aaa | APPLICATION A | "Application –" |
| bbb | APPLICATION B | "Application B DOCUMENT" |
| ccc | APPLICATION C | "DOCUMENT MADE WITH Application C" |
| ... | ... | ... |

FIG. 9

PRINT CONTROL APPARATUS, PRINT CONTROL METHOD, AND COMPUTER-READABLE STORAGE MEDIUM STORING A PRINT CONTROL PROGRAM

BACKGROUND OF THE INVENTION

1. Field of the Invention

The present invention relates to a print control apparatus that controls print data.

2. Description of the Related Art

A printer driver is an example of software for causing a printing apparatus such as a printer to execute print processing from an application running under an operating system (OS). A printer driver enables setting of various print modes such as paper cassette selection, color processing method settings, and paper ejection method selection according to the configuration of the printing apparatus. The printer driver converts print data (also referred to as document data) passed from an application along with the print modes to which the settings were made to a format that is acceptable to the printing apparatus, and sends them to the printing apparatus. Furthermore, the printer driver obtains document information for managing or displaying the document to be printed at the printing apparatus and adds the information to the print data. There may be a case where the printer driver is included in a print data managing system on the pathway to the printing apparatus, obtaining document information and managing and displaying the information. The document information is information necessary for print document management, such as a document name, user information, and time information.

Such document information is displayed on the print data managing system that manages print data or on a printing apparatus, and as a result, a user can specify a document that is in the process of printing, or can select a document to be printed from a document list stored in the printing apparatus.

Various techniques have been developed for a user to reliably specify a desired document in such a document list. Japanese Patent Laid-Open No. 2002-14788 (particularly paragraph 0062) describes a print data supplying apparatus that is capable of setting print job information to a character form compatible with display capability of the display device of the print output device when the character form of the print job information is out of display capability of the print job information display means. Japanese Patent Laid-Open No. 2002-91742 (particularly paragraph 0063) describes a print system capable of improving confidentiality of job data having confidential print settings when displaying status information relating to print status of the job data. Japanese Patent Laid-Open No. H10-301727 (particularly paragraph 0120) describes a print management system in which rough image data is created based on print data and displayed along with the print job management information, and as necessary, the print job data is encrypted and decrypted. It is described that according to this print management system, each print job can be easily and reliably distinguished.

In the above described document information, user information and time information have a fixed length in many cases, and therefore a region for displaying such information can be easily reserved in advance. However, because the document name can be decided freely by a user and has a variable length, it is difficult to specify its length in advance. Thus, depending on the document name, there may be a problem in that the document name cannot be displayed entirely in the region reserved in advance. Also, in many cases, dates and version information is added generally to the end of the document name. Therefore, when the document name cannot be displayed entirely as described above, the user cannot specify the document reliably.

Furthermore, there also may be a case where a character string (for example, application name) for identifying the application is automatically added to the beginning of the document name depending on the application, even if the user gave the document name considering the number of characters that can be displayed on the printing apparatus or the like. Thus, there may be a case where the document name cannot be shown entirely during document name display.

The aforementioned Patent Documents do not specifically mention such a problem in displaying based on the length of the document name.

SUMMARY OF THE INVENTION

In view of the above problems, the present invention provides a print control apparatus in which the document name can be changed and displayed for easier confirmation of the document name even in a printing apparatus that has restrictions in the display region.

According to one aspect of the present invention, there is provided a print control apparatus that gets document data from an application, converts the document data to a format acceptable to a printing apparatus, and sends the converted document data to the printing apparatus, the print control apparatus including: a first determination unit, configured to determine whether or not a document name of document data to be processed includes a predefined character string, a first deletion unit, configured to delete the character string from the document name to create a new document name when it is determined that the document name includes the predefined character string as a result of the determination by the first determination unit, a second determination unit, configured to determine whether or not the number of characters in the document name exceeds a predefined maximum number of displayable characters, and a second deletion unit, configured to delete a character from a head of the document name to create a new document name that does not exceed the maximum number of displayable characters when it is determined that the number of characters in the document name exceeds the predefined maximum number of displayable characters as a result of the determination by the second determination unit.

According to another aspect of the present invention, there is provided a print control apparatus that gets document data from an application, converts the document data to a format acceptable to a printing apparatus, and sends the converted document data to the printing apparatus, the print control apparatus including: an obtaining unit, configured to obtain the document name of the document data, and a change unit, configured to change the document name by deleting a head portion of the document name obtained by the obtaining unit so that the document name fits within a maximum number of displayable characters of the printing apparatus when the maximum number of displayable characters of the printing apparatus is exceeded.

According to still another aspect of the present invention, there is provided a print control apparatus that gets document data from an application, converts the document data to a format acceptable to a printing apparatus, and sends the converted document data to the printing apparatus, the print control apparatus including: a storage unit, configured to store a setting for changing a document name of the document data in association with the application that is a source of the document data, an obtaining unit, configured to get the document name of the document data, and a change unit, configured to change the document name obtained by the obtaining unit, based on the setting stored in the storage unit in association with the application, that is the source of the document data.

According to the above-described invention, the document name can be changed and displayed for easier confirmation of the document name even in a printing apparatus that has restrictions in the display region.

Further features of the present invention will become apparent from the following description of exemplary embodiments with reference to the attached drawings.

BRIEF DESCRIPTION OF THE DRAWINGS

FIG. 5B is a diagram illustrating an example of a user interface screen of a printer driver in an embodiment of the present invention.

FIG. 7 is a diagram illustrating an example of a management table that manages an extension, an application name, and a character string for deletion in association in this embodiment.

FIG. 9 is a diagram illustrating an example of a user interface screen of a printer driver used in the flowchart shown in FIG. 8.

DESCRIPTION OF THE EMBODIMENTS

Figure 1:
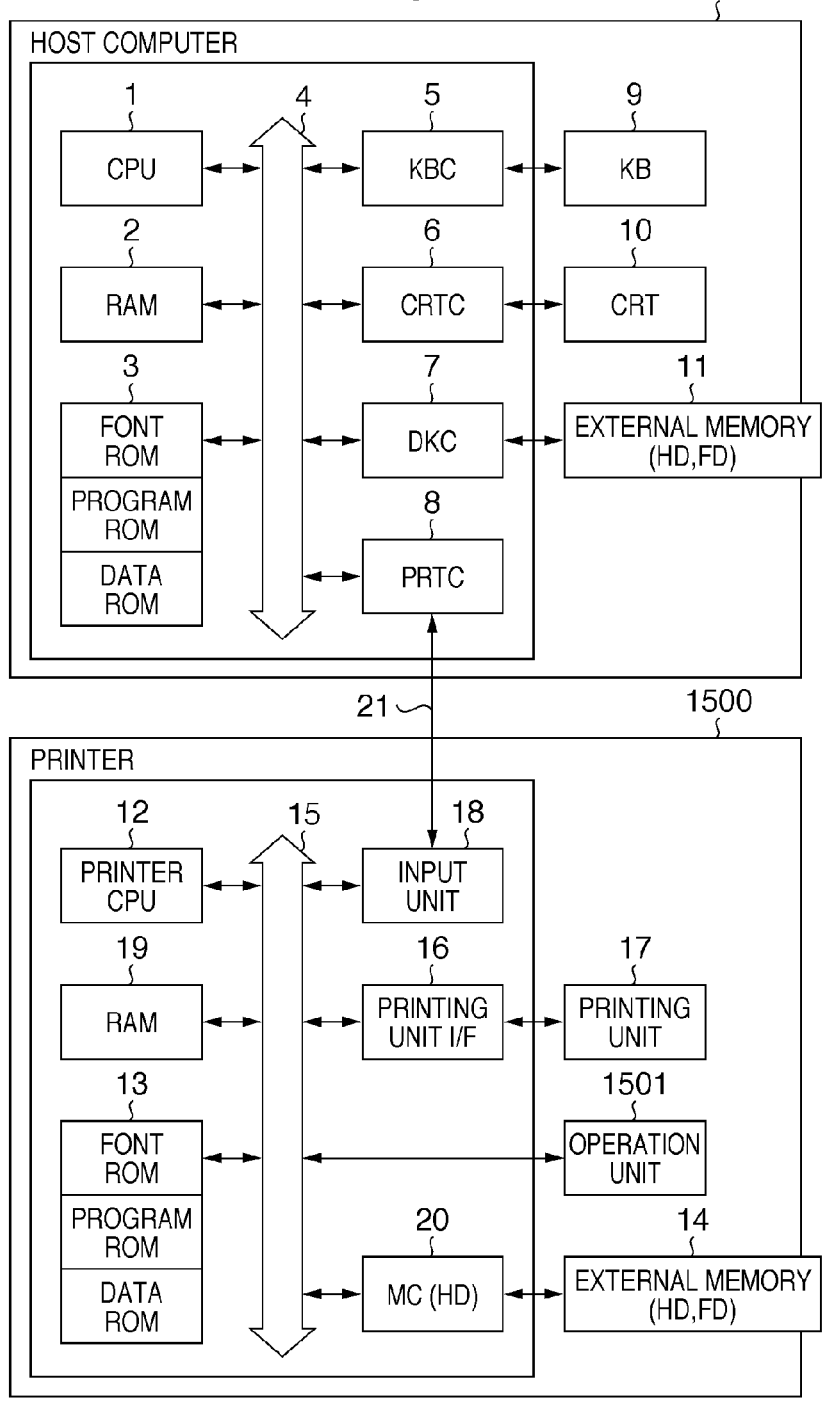
FIG. 1 is a diagram illustrating the configuration of a system including a print control apparatus in an embodiment according to the present invention.

Hereinafter, embodiments of the present invention will be described in detail with reference to the drawings. Note that the same reference numerals will be appended to the same constituent elements, and description thereof will be omitted.

FIG. 1 is a diagram illustrating the configuration of a system including a print control apparatus in an embodiment according to the present invention. As shown in FIG. 1, a host computer 3000 and a printer 1500 are connected via an interface 21. A CPU 1 included in the host computer 3000 executes document processing in which graphics, images, characters, tables (including spreadsheets), and the like are simultaneously included based on a document processing program and the like stored in a program ROM of a ROM 3 or an external memory 11. The CPU 1 performs overall control of each device connected to a system bus 4. An operating system (in the following, also referred to as OS) program or the like, that is, a control program of the CPU 1, is also stored in the program ROM of the ROM 3 or the external memory 11. Font data and the like used at the time of executing the above-described document processing are stored in a font ROM of the ROM 3 or the external memory 11. Various data used at the time of executing the above-described document processing are stored in a data ROM of the ROM 3 or the external memory 11.

The RAM 2 functions as a main memory or a work area, etc., of the CPU 1. A keyboard controller (KBC) 5 controls key input from a keyboard 9 and a pointing device, which is not shown. A CRT controller (CRTC) 6 controls display performed by a CRT display (CRT) 10. A disc controller (DKC) 7 controls access to the external memory 11 storing a boot program, various applications, font data, user files, edit files, printer control command creation programs (in the following, referred to as a printer driver), and the like. For the external memory 11, for example, a hard disk (HD), a Floppy® disc (FD), and the like are used. A printer controller (PRTC) 8 is connected to the printer 1500 via an interface 21, which is a predetermined bidirectional interface, and carries out communication control processing with the printer 1500. The CPU 1 executes generating processing (rasterization) of an outline font of the display information that was set, for example, in the RAM 2, achieving WYSIWYG on the CRT 10.

The CPU 1 also opens various windows that are registered based on a command made with a mouse cursor or the like, which is not shown, on the CRT 10, and executes various types of data processing. At the time of executing the printing, the user can open windows relating to the print settings and set print processing methods for the printer driver, including printer settings and print mode selection.

In the printer 1500, a printer CPU 12 operates based on a control program and the like stored in a program ROM of a ROM 13 or on a control program and the like stored in an external memory 14. Based on such operation, an image signal as output information can be output to a print unit (printer engine) 17 connected to a system bus 15 via a printing unit I/F 16. Also, the program ROM of the ROM 13 stores a control program and the like of the printer CPU 12. A font ROM of the ROM 13 stores font data and the like used when generating the above-described output information are stored. A data ROM of the ROM 13 stores information and the like used on the host computer, in the case of the printer having no external memory 14 such as a hard disk.

The printer CPU 12 is capable of carrying out communication processing with the host computer 3000 through an input unit 18, and is capable of notifying the host computer 3000 of information and the like in the printer. A RAM 19 in the printer CPU 12 functions as a work area and the like, and its memory capacity can be expanded by an optional RAM connected to an expansion port, which is not shown. The RAM 19 is used as an output information generating region, an environment data storing region, NVRAM, or the like. The access to the above-mentioned external memory 14 such as a hard disk (HD) and an IC card is controlled by a memory controller (MC) 20.

The external memory 14 is optionally connected, and stores font data, an emulation program, form data and the like. On the input unit 18, switches, LED indicators, or the like for making operation at an operation panel are disposed. One or more of the above-described external memory can be provided, and the configuration can be made so that a plurality of optional font cards additional to the built-in font and external memories storing a program that interprets printer control languages (also referred to as page description language) of a different language type can be connected. Furthermore, NVRAM, which is not shown, can be provided so as to store printer mode settings information from an operation unit 1501.

Note that although the host computer in FIG. 1 is configured of one device, the host computer may be configured of a system made up of a plurality of devices to execute functions of the present invention. The configuration also can be made via a network such as a LAN, and WAN to execute the functions of the present invention.

Figure 2:
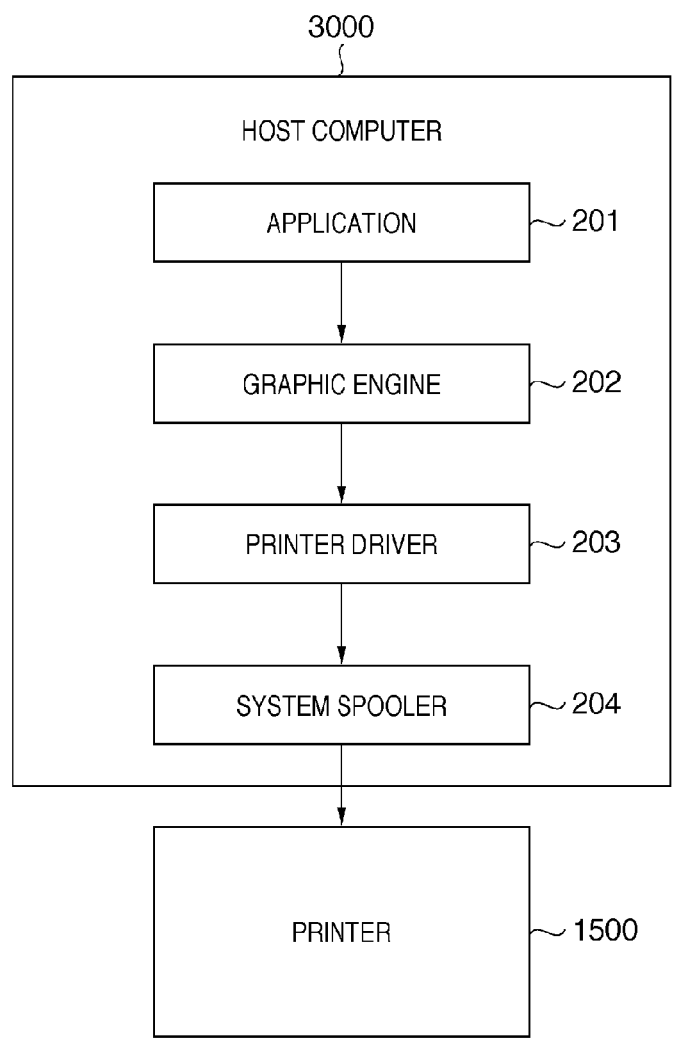
FIG. 2 is a diagram illustrating the module configuration relating to print processing in the host computer shown in FIG. 1.

FIG. 2 is a diagram illustrating the module configuration relating to print processing in the host computer 3000 shown in FIG. 1. As shown in FIG. 1, the host computer 3000 includes, as modules, an application 201, a graphic engine 202, a printer driver 203, and a system spooler 204. These modules are stored, for example, files in the external memory 11. Furthermore, when these modules are to be executed, the modules are loaded to the RAM 2 by the OS or other modules using these modules, and then executed. The application 201 and the printer driver 203 can be added to the HD of the external memory 11 via the FD or a CD-ROM, which is not shown, of the external memory 11, or, via a network, which is not shown. The application 201 stored in the external memory 11 is loaded to the RAM 2 and executed. When the application 201 instructs the printer 1500 to perform printing, output (rendering) can be carried out by using the graphic engine 202 that is also loaded to the RAM 2 and is executable. The graphic engine 202 also loads the printer driver 203 provided for every printing apparatus from the external memory 11 to the RAM 2, and converts the output of the application 201 to a control command of the printer using the printer driver 203. The converted printer control command is output to the printer 1500 via the interface 21, going through the system spooler 204 loaded to the RAM 2 by the OS.

Figure 3:
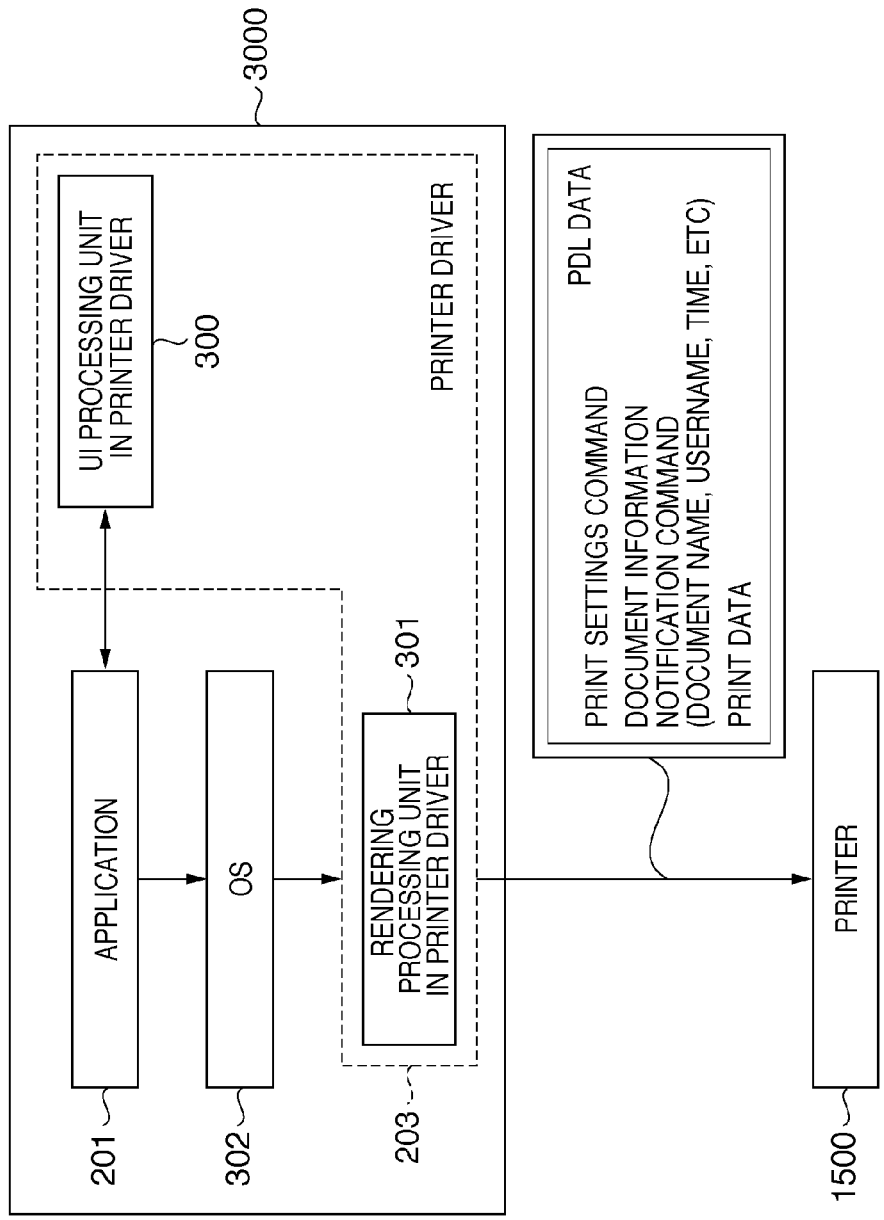
FIG. 3 is a diagram illustrating a summary of procedures, in a printer driver, of processing that creates data to be output to the printer.

Next, a summary of procedures in the printer driver 203 of creating data to be output to the printer 1500 is described. FIG. 3 is a diagram illustrating a summary of procedures, in the printer driver 203, of processing that creates data to be output to the printer 1500. As described in FIG. 1, the application 201, the OS 302, and the printer driver 203 shown in FIG. 3 are stored, for example, in the external memory 11 of the host computer 3000. The printer driver 203 includes, as shown in FIG. 3, a UI processing unit 300 in printer driver and a rendering processing unit 301 in printer driver. The term "UI" means a "user interface". In FIG. 3, the graphic engine 202 and the system spooler 204 are omitted.

The UI processing unit 300 in printer driver controls other modules according to the settings input by a user on a user interface screen of the printer driver 203 to be mentioned later. In FIG. 3, the UI processing unit 300 in printer driver notifies the application 201 of the print settings that were set. At the time of starting printing, the print settings and the print data are passed to the rendering processing unit 301 in printer driver from the application 201 via the OS 302. At that time, the rendering processing unit 301 in printer driver also obtains document information set by the application 201. Afterwards, the obtained print data, print settings, and document information are converted to a format that is acceptable to the printing apparatus by the rendering processing unit 301 in printer driver. The format-converted print data, print settings, and document information are combined, and PDL data is created therefrom. FIG. 3 shows, as a concept, the print settings, and document information in a command format, and the print data combined as PDL data. The created PDL data is sent to the printer 1500 from the rendering processing unit 301 in printer driver. The printer 1500, that is, a printing apparatus, receives the PDL data, generates and records an image on a sheet of paper, and displays the name of the document that is in the print processing on the display unit.

Figure 4A:
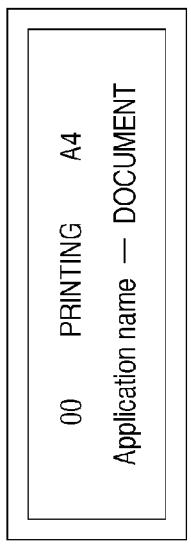
FIG. 4A is a diagram illustrating an example where the document name is partially displayed on the printing apparatus.
Figure 4B:
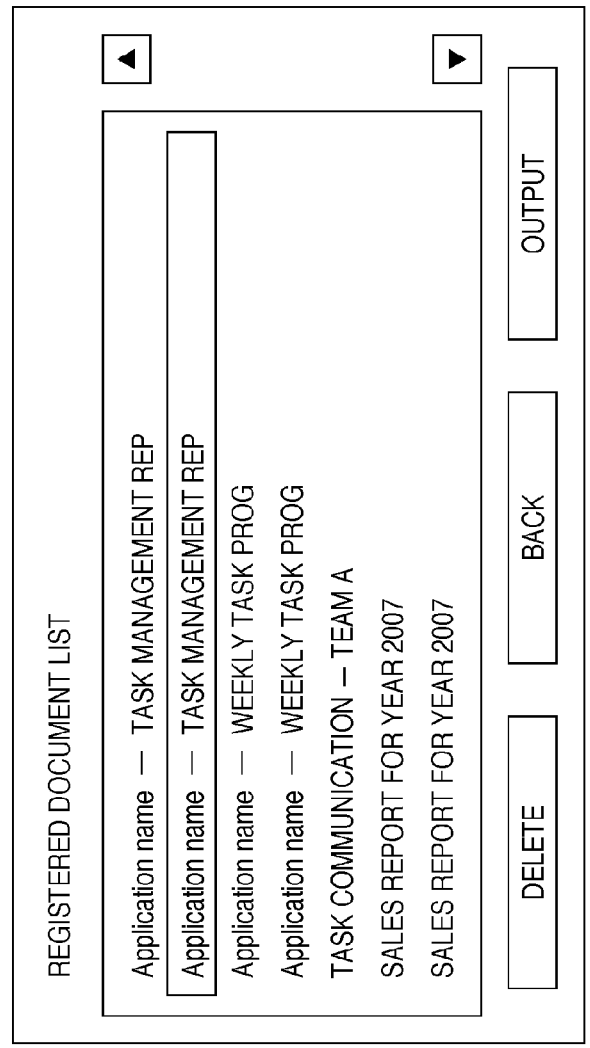
FIG. 4B is a diagram illustrating an example where the document name is partially displayed on the printing apparatus.

FIG. 4A and FIG. 4B are diagrams illustrating examples where the document name is partially displayed on the printing apparatus. When the document name is longer than the displayable number of characters, only a part of the document name is displayed, as in "Application name-Docum" shown in FIG. 4A. Furthermore, depending on the printing apparatus, there may be a case where it is necessary that the document to be printed be held in an external disc once, and then the printing is executed after a print command is made on the display unit provided on the printing apparatus. FIG. 4B shows an example of a display unit of a printing apparatus in such a case. In such a case as well, when only a part of the document name is displayed, the document that needs to be printed cannot be specified reliably.

Figure 5A:
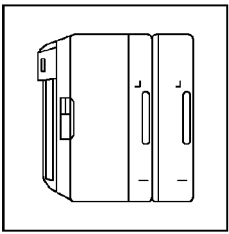
FIG. 5A is a diagram illustrating an example of a user interface screen of a printer driver in an embodiment of the present invention.

FIG. 5A and FIG. 5B are diagrams illustrating examples of a screen of the user interface of the printer driver in this embodiment. In this embodiment, when "manage document name" is selected on the screen shown in FIG. 5A, the printer driver opens a settings window as shown in FIG. 5B. In the settings window of FIG. 5B, a specific character string can be set and registered. For example, in FIG. 5B, a specific character string within 16 full-width characters can be set. Also, in a settings tag shown in FIG. 5B, the number of displayable characters to be mentioned later may be set.

In the settings window shown in FIG. 5B, along with the registration of a specific character string, a setting for deleting can be specified. In this embodiment, as shown in FIG. 5B, selection can be made between two settings of deletion, namely, "delete up to and including the character string below" and "delete the character string below". When "delete up to and including the character string" shown in FIG. 5B is selected, all the characters from the beginning of the document name up to and including the specific character string set are deleted. When "delete the character string below" shown in FIG. 5B is selected, only the specific character string set is deleted from the document name. Although one delete setting and one character string are registered in this embodiment, a plurality of the delete settings and character strings can be registered.

Furthermore, in this embodiment, as shown in FIG. 5B, a setting of "delete head portion when the document name exceeds the number of displayable characters of the printing apparatus" can be selected. In this embodiment, the maximum number of displayable characters of the printing apparatus for the document name is registered in advance to the printer driver. When the document name exceeds the registered maximum number of displayable characters, the document name may be the character string corresponding to the maximum number of displayable characters from the end of the document name. Although the setting items are not shown in the example in FIG. 5 because the maximum number of displayable characters of the printing apparatus is registered in advance, the settings can be made on the screen of, for example, FIG. 5B.

Figure 6A:
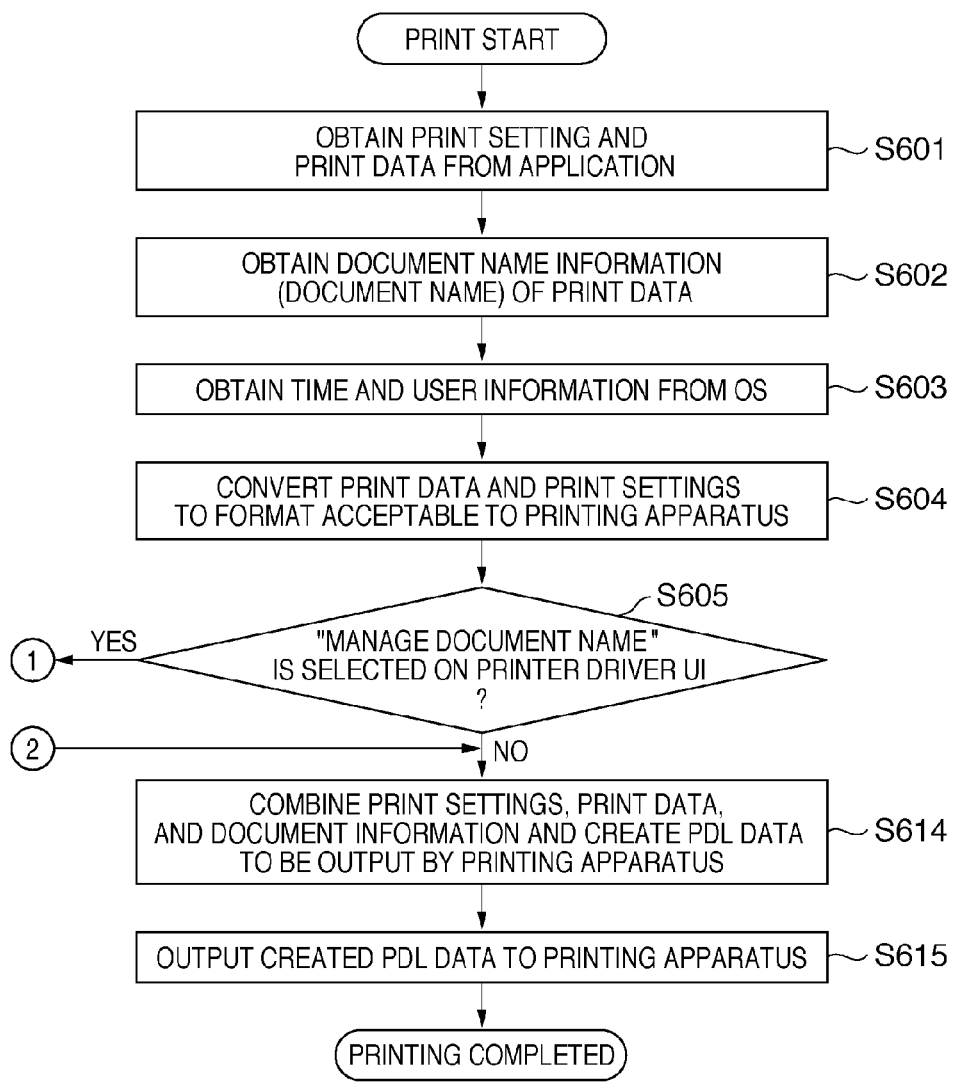
FIGS. 6A and 6B are flowcharts illustrating procedures of processing that determine a document name to be output to a printing apparatus in the first embodiment.
Figure 6B:
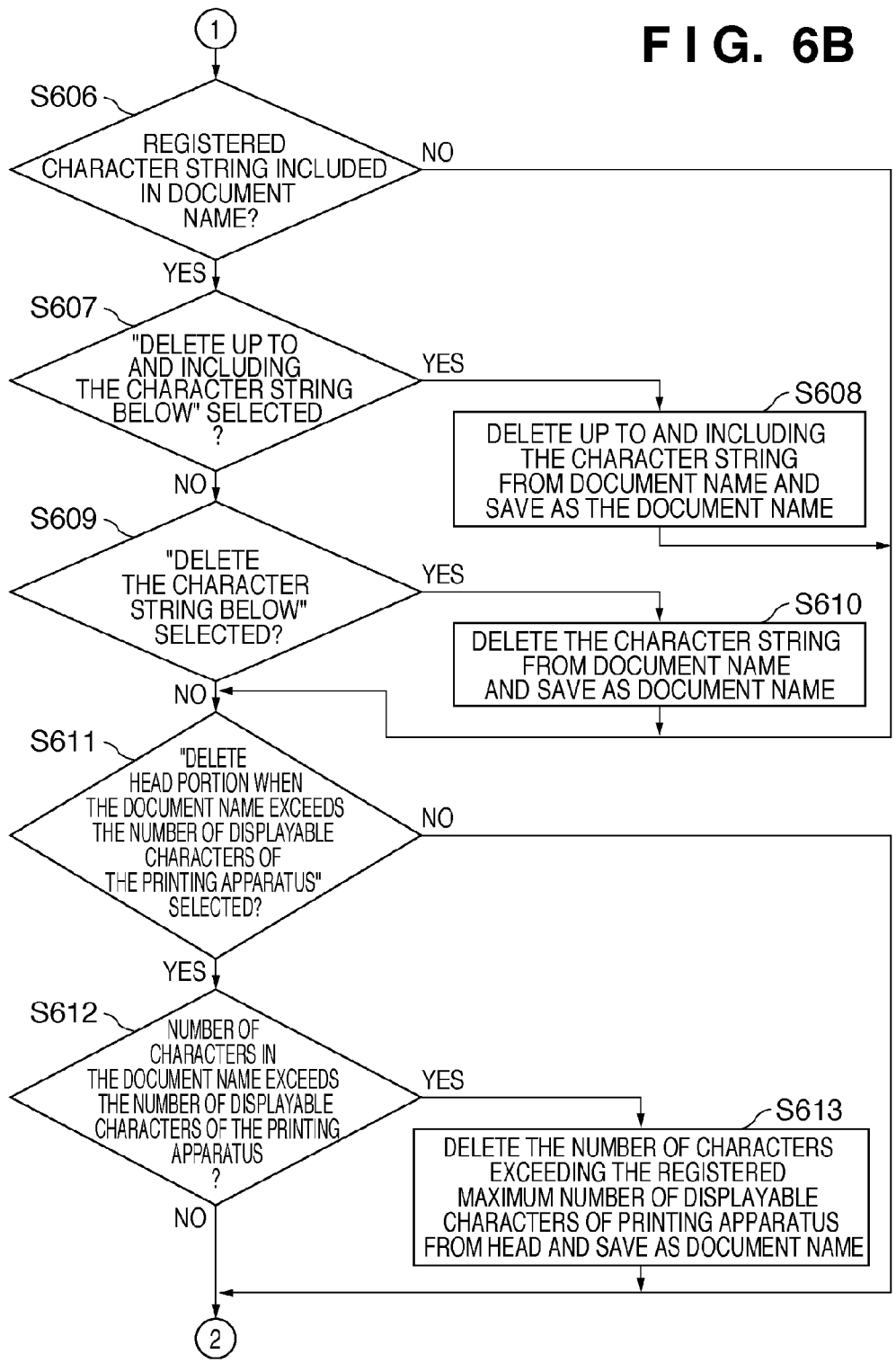

Processing that determines a document name to be output to the printing apparatus according to the contents of settings made on screens shown in FIGS. 5A and 5B is described with reference to FIGS. 6A and 6B. FIGS. 6A and 6B are flowcharts illustrating processing procedures in which a document name to be output to the printing apparatus in the first embodiment is determined (changed).

First, in step S601, when a user makes a command of printing, the print data and print settings are passed to the rendering processing unit 301 in printer driver from the application 201 via the OS. In step S602, the rendering processing unit 301 in printer driver obtains the document name information of the document to be printed from the application 201. Next, in step S603, the rendering processing unit 301 in printer driver obtains user information including the time of the print start, login name, and the like from the OS 302. In step S604, the rendering processing unit 301 in printer driver converts the print data, print settings, and user information from the application 201 to a format appropriate for the printing apparatus according to the print settings specified on the screens shown in FIGS. 5A and 5B, and creates PDL data.

Next, in step S605, a determination is made as to whether or not "manage document name" is selected on the screen shown in FIG. 5A. When it is determined that "manage document name" is selected, the process moves to step S606. On the other hand, when it is determined that it is not selected, the process moves to step S614. Step S614 is to be mentioned later.

In step S606, a determination is made as to whether or not the character string for deletion registered is included in the document name. When it is determined that it is included in the document name, the process moves to step S607. On the other hand, when it is determined that it is not included in the document name, the process moves to step S611. Step S611 is to be mentioned later. The determination processing described in step S606 is an example of "first determination processing" in this embodiment.

In step S607, a determination is made as to whether or not "delete up to and including the character string below" is selected on the screen shown in FIG. 5B. When it is determined that it is selected, the process moves to step S608, in which a portion of the document name from the head of the document name to the registered character string is deleted, and the result is newly stored as the document name. On the other hand, when it is determined that it is not selected, the process moves to step S609, in which a determination is made as to whether or not "delete the character string below" is selected on the screen shown in FIG. 5B. When it is determined that it is selected, the process moves to step S610, in which the character string is deleted from the document name, and the result is newly stored as the document name. On the other hand, when it is determined that it is not selected, the process moves to step S611.

The processing that deletes specified character strings as described in steps S607 to S610 is an example of "first delete processing" in this embodiment.

In step S611, a determination is made as to whether or not "delete head portion when the document name exceeds the number of displayable characters of the printing apparatus" is selected on the screen shown in FIG. 5B. When it is determined that it is selected, the process moves to step S612. On the other hand, when it is determined that it is not selected, the process moves to step S614.

In step S612, the document name length and the number of displayable characters of the printing apparatus registered in advance are compared, and a determination is made as to whether the document name length exceeds the number of displayable characters of the printing apparatus registered in advance. When it is determined that it is exceeding, the process moves to step S613, in which the number of characters exceeded is deleted from the head portion, and the result is newly stored as the document name. On the other hand, when it is determined that it is not exceeding, the process moves to step S614.

The processing described in step S612 is an example of "second determination processing" in this embodiment. The processing described in step S613 is an example of "second delete processing" in this embodiment.

In step S614, the print settings, the print data, and the document information created in the rendering processing unit 301 in printer driver are combined, and PDL data is created therefrom. In step S615, the created PDL data is output to the printer 1500.

Next, procedures in the processing in this embodiment are described using detailed examples of settings on the screens shown in FIGS. 5A and 5B. It is assumed that the following settings are made on the screens shown in FIGS. 5A and 5B.

"delete up to and including the character string below": selected.

character string for deletion registered: "-".

maximum number of displayable characters of printing apparatus: 20 half size characters.

"delete head portion when the document name exceeds maximum number of displayable characters of printing apparatus": selected.

The document name passed to the rendering processing unit 301 in printer driver from the application 201 via the OS 302 is set to "Application name-weekly task progress of team A 20071010.txt".

That is, in the character string forming the document name, the character string from the head up to and including the specific character string is deleted (here, up to and including "-(hyphen)"), and the obtained character string is set as the document name. Additionally, when the obtained document name length exceeds the preset length (here, 20 half size characters), the settings are made to delete characters forming the document name, beginning from the head, so that the document name length is the preset length.

First, "-", which is registered as the character string to be deleted, is searched for in the document name. In this embodiment, because the document name includes "-" between "name" and "weekly", the character string from the head of the document name up to and including "-", that is, "Application name-", is deleted from the document name. When a plurality of character strings to be deleted are registered, the above-described operation is repeated. When the processing for all the character strings to be deleted is completed, the document name in this embodiment will be "weekly task progress of team A 20071010.txt".

Next, when the settings are made for the maximum number of displayable characters, the document name and the maximum number of displayable characters are compared. "Weekly task progress of team A 20071010.txt" is 43 half size characters, and exceeds the registered number of displayable characters of the printing apparatus, that is, 20. Therefore, 20 half size characters are extracted, beginning from the end of the document name. As a result, the document name will be "team A 20071010.txt". This character string is output to the printer 1500 as a new name for the document.

Although the processing of the document name is carried out in the printer driver 203 in this embodiment, the processing may be carried out by the application managing print data, between the printer driver 203 and the printer 1500. Or, the processing of the document name can be carried out in the printer 1500. Also, in the processing shown in FIGS. 6A and 6B, for example, the extension such as ".xyz" that is added to the end of the document name and specifies the application can be deleted before step S614.

As described above, the character string for deletion registered is deleted from the document name passed from the application 201 by the printer driver 203, and further, when the document name exceeds the maximum number of displayable characters of the printing apparatus, the exceeding portion is deleted. Thus, the portion commonly added to the document is deleted, and the document name can be displayed within the limitation of displayable characters of the printer 1500 while leaving the portion including important information such as date information for specifying the document date information. As a result, the user can reliably specify the desired document from the displayed document names.

Next, the second embodiment is described. On one hand, there are cases where there is no common format for the character string added to the document name depending on applications. On the other hand, there are cases where a specific character string is always added, depending on applications. For example, in application A, a character string "Application-" is added, whereas in application B, a character string "ApplicationBdocument-" is added. In such a case, it is effective to register in advance a character string for deletion for each application, and delete the character string based on such registration.

When an extension for specifying the application is added to the end of the document name and the document is selected by using the extension, a corresponding application is selected and the document is opened. The extension is generally formed of three alphanumeric letters following ".", such as ".aaa", ".bbb", and ".ccc". Thus, the character string corresponding to the extension is registered in the printer driver, and when the extension matches, the character string for deletion registered is deleted from the document name.

FIG. 7 is a diagram illustrating an example of a management table in this embodiment, in which an extension, an application name, and a character string for deletion are associated and managed. For example, the extension of application A is "aaa", and in this application, the character string "ApplicationA-" is always added to the document name. Therefore, in this embodiment, "ApplicationA-" is deleted from the document name to which the character string is added. The extension of application B is "bbb", and in this application, the character string "ApplicationBdocument" is always added to the document name. Therefore, in this embodiment, "ApplicationBdocument" is deleted from the document name to which the character string is added. The extension of application C is "ccc", and in this application, the character string "document made with ApplicationC" is always added to the document name. Therefore, in this embodiment, "document made with ApplicationC" is deleted from the document name to which the character string is added.

The management table shown in FIG. 7 may be set, for example, on the user interface screens of the printer driver shown in FIGS. 5A and 5B. In such a case, the table as shown in FIG. 7 may be made by the UI processing unit 300 in printer driver according to the settings input on the screens shown in FIGS. 5A and 5B, and may be stored in the data ROM and the like of the ROM 3.

Figure 8:
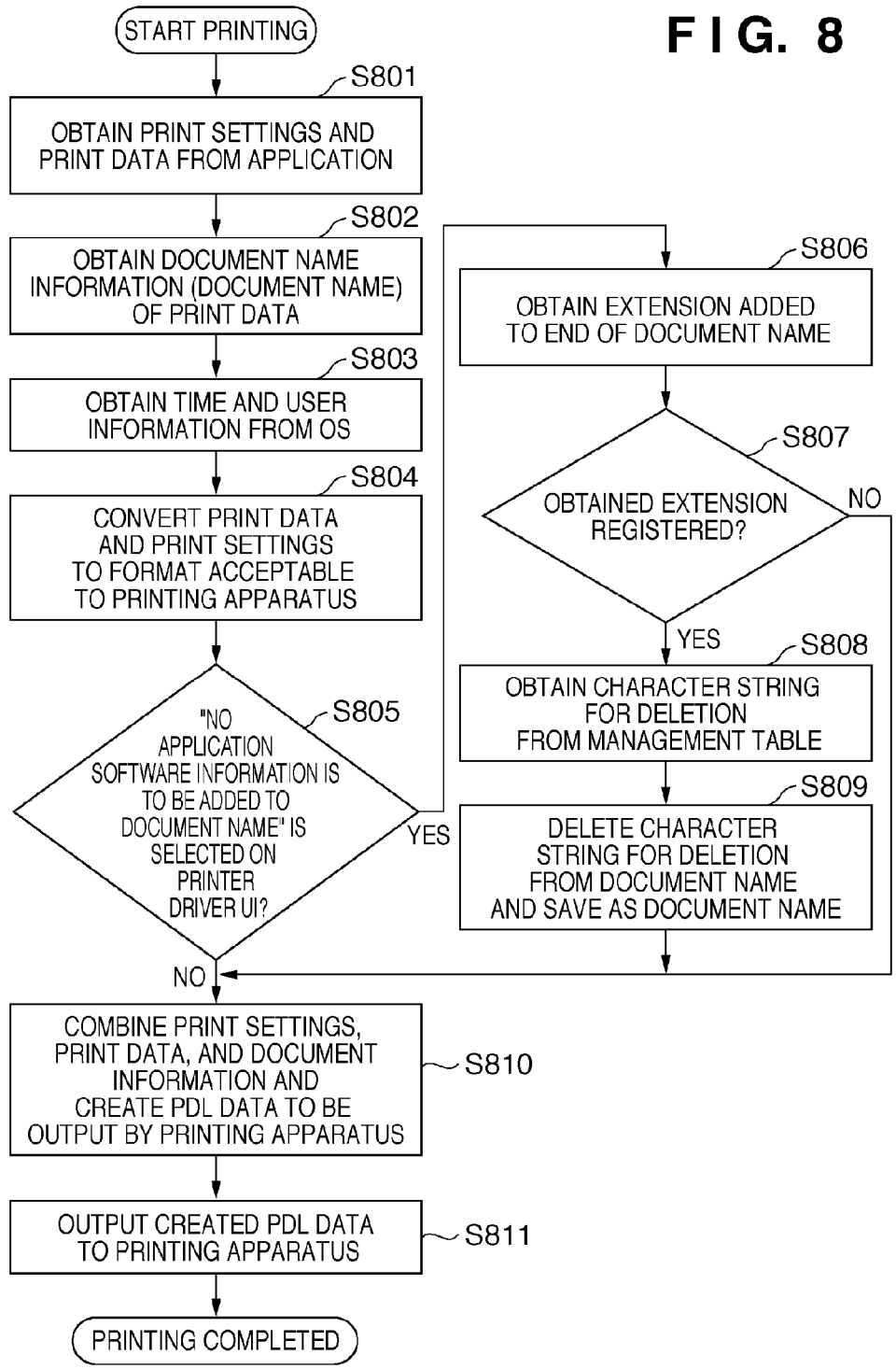
FIG. 8 is a flowchart illustrating procedures of processing that determines a document name to be output to a printing apparatus in the second embodiment.

The following describes processing in which the application is specified from the extension added to the end of the document name, and the character string for deletion added by the application is deleted. FIG. 8 is a flowchart illustrating procedures of processing that determines (changes) a document name to be output to the printing apparatus in the second embodiment. In this embodiment, the application is specified from the extension added to the end of the document name by using the management table shown in FIG. 7, and the character string added by the application is deleted.

First, in step S801, when a command of printing is made, the print data and print settings are passed to the rendering processing unit 301 in printer driver from the application 201 via the OS 302. In step S802, the rendering processing unit 301 in printer driver obtains the document name information of the document to be printed from the application 201. In step S803, the rendering processing unit 301 in printer driver obtains user information such as the time of the print start and login name from the OS 302. In step S804, the rendering processing unit 301 in printer driver converts the print data obtained from the application 201 to a format appropriate to the printer 1500 according to the print settings specified on the screens shown in FIGS. 5A and 5B, and creates PDL data. Next, in step S805, a determination is made as to whether or not "no application software information is to be added to document name" is selected on the user interface screen of the printer driver shown in FIG. 9. When it is determined that it is selected, the process moves to step S806, in which the extension of three alphanumeric letters following "." added to the end of the document name for specifying the application is obtained. On the other hand, when it is determined that it is not selected, the process moves to step S810.

After the completion of the processing in step S806, in step S807, a determination is made as to whether or not the obtained extension is listed in the management table registered in advance as shown in FIG. 7. When it is determined that it is listed, the process moves to step S808, in which the character string for deletion is obtained from the management table. In step S809, the registered character string is deleted from the document name, and a new name is saved for the document. On the other hand, when it is determined that it is not listed, the process moves to step S810.

In step S810, the print settings, the print data, and the document information created in the rendering processing unit 301 in printer driver are combined, and PDL data is created therefrom. The created PDL data is output to the printer 1500 from the rendering processing unit 301 in printer driver in step S811.

As described above, in this embodiment, the extension added to the end of the document name is obtained, and a determination is made as to the presence or absence of the character string for deletion corresponding to that extension by referring to the management table. When the character string for deletion is present, the character string for deletion is deleted from the document name. Thus, the portion commonly added to the document name based on applications is deleted, and the document name can be displayed within the limitation of displayable characters of the printer 1500 while leaving the portion including important information such as date information for specifying the document date information. As a result, the user can reliably specify the desired document from the displayed document names.

Figure 9:
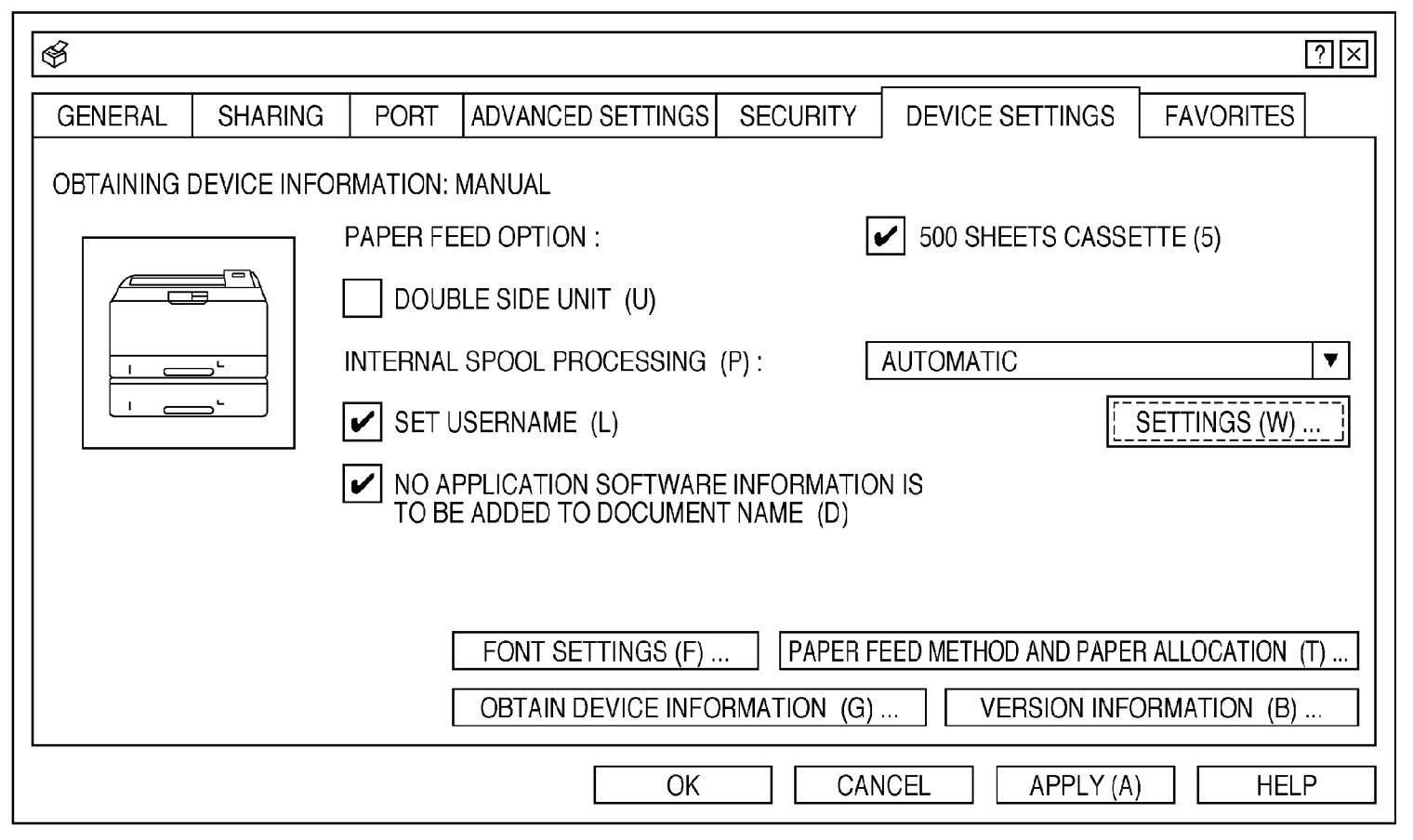

In this embodiment, the processing in steps S611 to S613 described in FIGS. 6A and 6B in the first embodiment may be further carried out after step S809. Even if the result of deleting the portion commonly added based on application from the document name exceeds the number of displayable characters of the printer 1500, the document name can be displayed within the displayable characters limitation of the printer 1500 while leaving the portion including information important for specifying the document. Furthermore, in this embodiment, settings may be made so that a user can set the maximum number of displayable characters of the printing apparatus on the screen as shown in FIG. 9.

In addition, the case where an operating system (OS) running in a computer performs part or all of the actual processing based on the program (print control program) code, and the functionality of the aforementioned embodiment is realized by that processing, is included in the scope of the present invention. Furthermore, the present invention can also be applied in the case where the program code read out from the computer-readable storage medium is written into a memory provided in a function expansion card installed in the computer or a function expansion unit connected to the computer. In such a case, a CPU or the like provided in the function expansion card or the function expansion unit performs part or all of the actual processing based on the program code, and the functionality of the aforementioned embodiment is realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-042073, filed Feb. 22, 2008, which is hereby incorporated by reference herein in its entirety.

What is claimed is:

1. A non-transitory computer readable medium in which a printer driver program is stored for causing a computer to execute a method of generating print data and transmitting the generated print data to a printer, the method comprising receiving a delete setting from a user, the delete setting indicating a particular character string to be deleted and whether further deletion of characters, if necessary, is to start from a head end of a document name; determining whether or not use of a shortened job name for the document name is directed; if it is determined that use of the shortened job name for the document name is directed: deleting the particular character string from the document name in accordance with the delete setting and, if necessary, carrying out the further deletion of characters in accordance with the delete setting, to obtain the shortened job name; generating print data including the shortened job name and transmitting the generated print data to a printer; and if it is determined that use of the shortened job name is not directed: generating print data including the document name from which the character string is not deleted; and transmitting the generated print data to the printer, wherein the document name included in the print data is displayed by the printer.

2. The medium according to claim 1, wherein the character string for deletion is stored for each application.

3. The medium according to claim 1, wherein the character string for deletion contains an application name.

4. The medium according to claim 2, wherein the character string for deletion is stored corresponding to an identifier of an application, and wherein the method further comprises:
   obtaining an identifier of an application contained in the document name; and
   deleting a character string for deletion corresponding to the obtained identifier.

5. A method of generating print data and transmitting the generated print data to a printer, the method comprising: receiving a delete setting from a user, the delete setting indicating a particular character string to be deleted and whether further deletion of characters, if necessary, is to start from a head end of a document name; determining whether or not use of a shortened job name for the document name is directed; if it is determined that use of the shortened job name for the document name is directed: deleting the particular character string from the document name in accordance with the delete setting and, if necessary, carrying out the further deletion of characters in accordance with the delete setting, to obtain the shortened job name; generating print data including the shortened job name; and transmitting the generated print data to a printer; and if it is determined that use of the shortened job name is not directed: generating print data including the document name from which the character string is not deleted; and transmitting the generated print data to the printer, wherein the document name included in the print data is displayed by the printer, wherein the document name included in the print data is displayed by the printer.

6. The method according to claim 5, wherein the character string for deletion is stored for each application.

7. The method according to claim 5, wherein the character string for deletion contains an application name.

8. The method according to claim 6, wherein the character string for deletion is stored corresponding to an identifier of an application, and wherein the method further comprises:
   obtaining an identifier of an application contained in the document name; and
   deleting a character string for deletion corresponding to the obtained identifier.

9. An apparatus for generating print data and transmitting the generated print data to a printer, comprising: a receiving unit configured to receive a delete setting from a user, the delete setting indicating a particular character string to be deleted and whether further deletion of characters, if necessary, is to start from a head end of a document name; a determining unit configured to determine whether or not use of a shortened job name for the document name is directed; and a processing unit configured, if it is determined that use of the shortened job name for the document name is directed, to: delete the particular character string from the document name in accordance with the delete setting and, if necessary, carrying out the further deletion of characters in accordance with the delete setting, to obtain the shortened job name; generate print data including the shortened job name; and transmit the generated print data to a printer; the processing unit further configured, if it is determined that use of the shortened job name is not directed, to: generate print data including the document name from which the character string is not deleted; and transmit the generated print data to the printer, wherein the document name included in the print data is displayed by the printer.

10. The apparatus according to claim 9, wherein the character string for deletion is stored for each application.

11. The apparatus according to claim 9, wherein the character string for deletion contains an application name.

12. The apparatus according to claim 10,
   wherein the character string for deletion is stored corresponding to an identifier of an application, and
   wherein the processing unit is further configured to obtain an identifier of an application contained in the document name, and delete a character string for deletion corresponding to the obtained identifier.

* * * * *